United States Patent [19]

Kawase

[11] Patent Number: 5,339,521
[45] Date of Patent: Aug. 23, 1994

[54] MACHINING METHOD OF CERAMIC TURBINE ROTOR

[75] Inventor: Hiroyuki Kawase, Nagoya, Japan
[73] Assignee: NGK Insulators, Ltd., Japan
[21] Appl. No.: 33,795
[22] Filed: Mar. 18, 1993

[30] Foreign Application Priority Data

Mar. 26, 1992 [JP] Japan .................. 4-101879

[51] Int. Cl.$^5$ .......................................... B23P 15/00
[52] U.S. Cl. ....................... 29/889.23; 51/281 P; 51/289 R; 51/326
[58] Field of Search .......... 29/889.23; 51/281 R, 51/281 P, 289 R, 326, 327

[56] References Cited

U.S. PATENT DOCUMENTS

| | | | |
|---|---|---|---|
| 2,480,807 | 8/1949 | Vlieg | 29/889.23 |
| 4,051,636 | 10/1977 | Heine | 51/281 R |
| 4,520,541 | 6/1985 | Miki et al. | 29/889.23 |
| 4,584,795 | 4/1986 | Akabane | 51/289 R |
| 4,709,508 | 12/1987 | Junker | 51/289 R |
| 4,858,393 | 8/1989 | Yamada | 51/289 R |

FOREIGN PATENT DOCUMENTS

| | | | |
|---|---|---|---|
| 0152538 | 11/1981 | Japan | 29/889.23 |
| 61-41922 | 11/1986 | Japan . | |
| 2-83155 | 3/1990 | Japan . | |
| 0795708 | 1/1981 | U.S.S.R. | 29/889.23 |
| 0994800 | 2/1983 | U.S.S.R. | 29/889.23 |

*Primary Examiner*—Irene Cuda
*Attorney, Agent, or Firm*—Parkhurst, Wendell & Rossi

[57] ABSTRACT

A machining method of a ceramic turbine rotor having a hub portion integrally formed with a plurality of radial blades, the hub portion having a front end to be centered during a finishing process of the radial blades and a rear end coaxially connected to a metallic support shaft, which machining method includes the steps of grinding the front distal end of said hub portion to form a tapered surface thereon; engaging the tapered surface of said hub portion with a corresponding tapered surface of an attachment mounted on a spindle of a headstock or a tailstock; and finishing the radial blades of said rotor in a desired form.

2 Claims, 4 Drawing Sheets

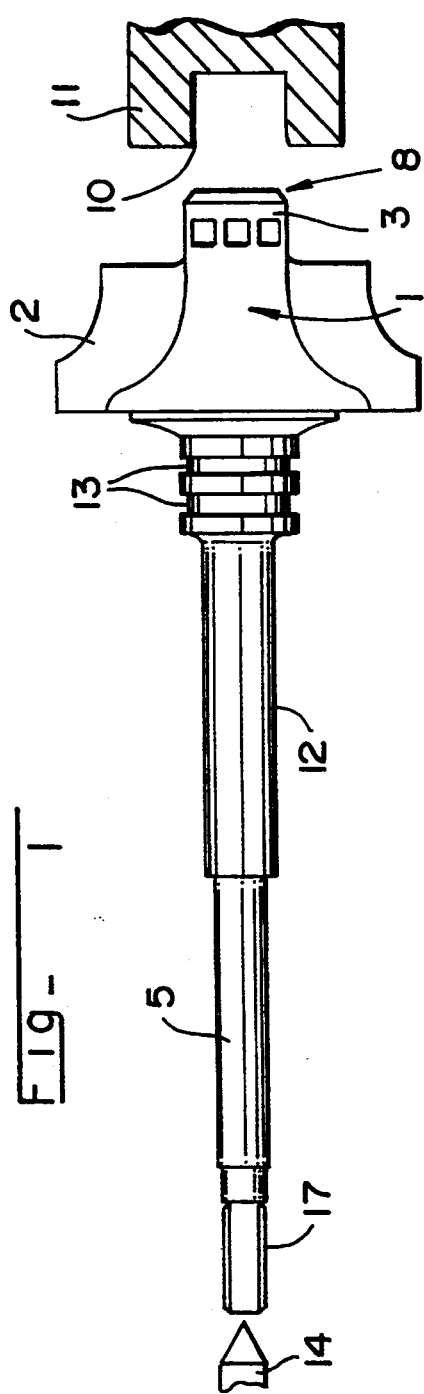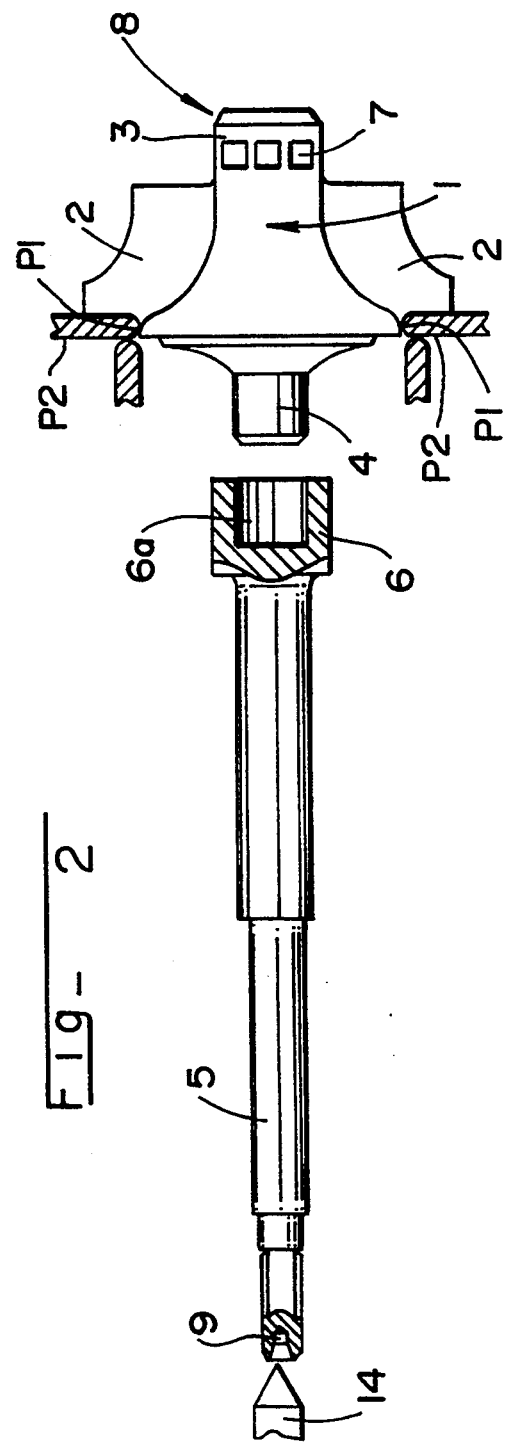

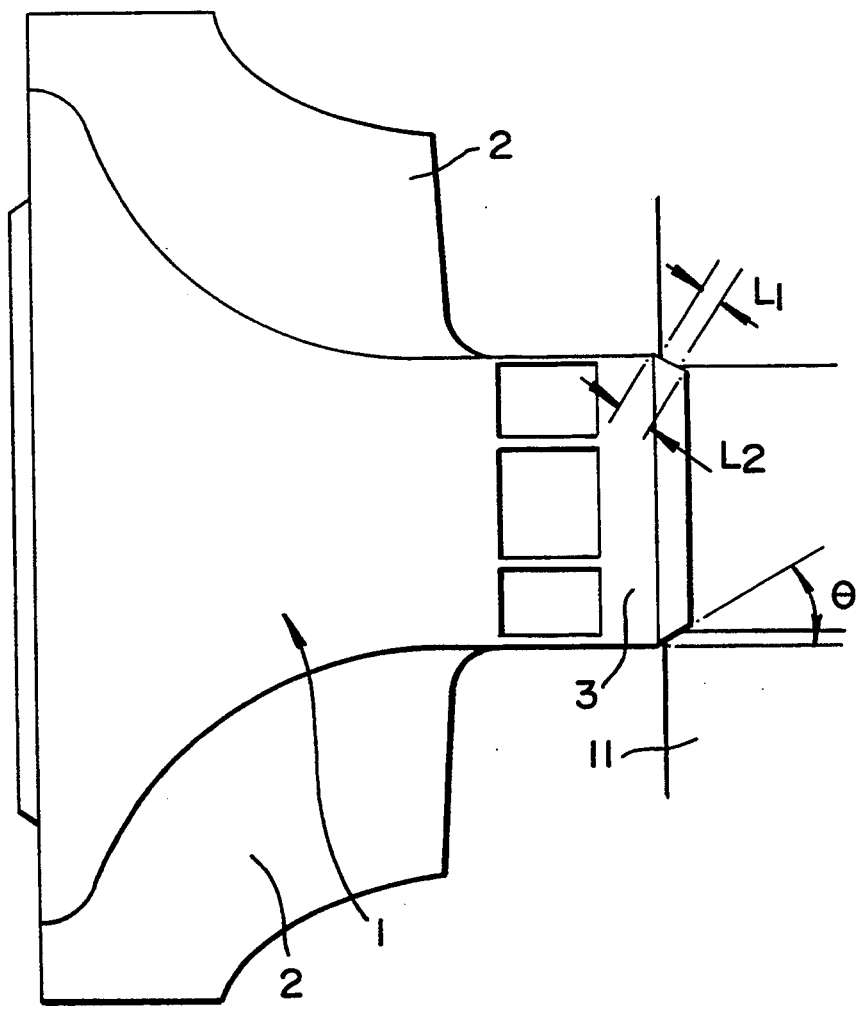

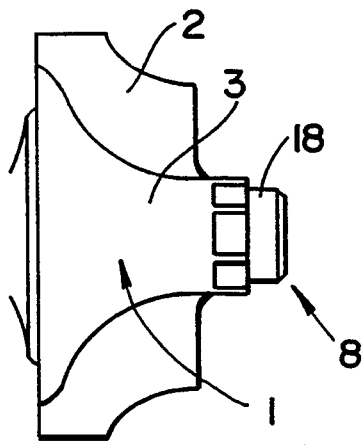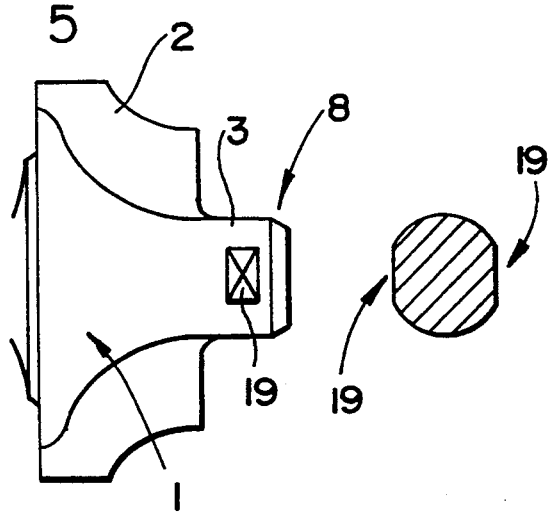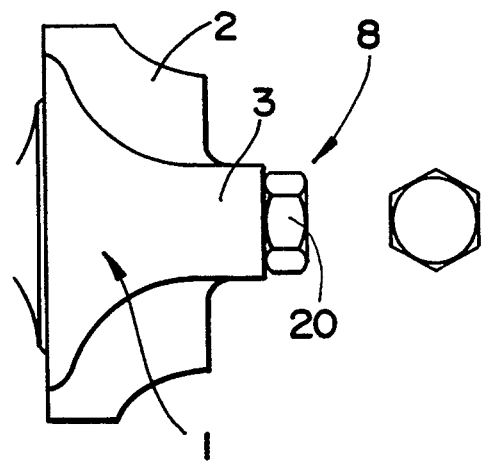

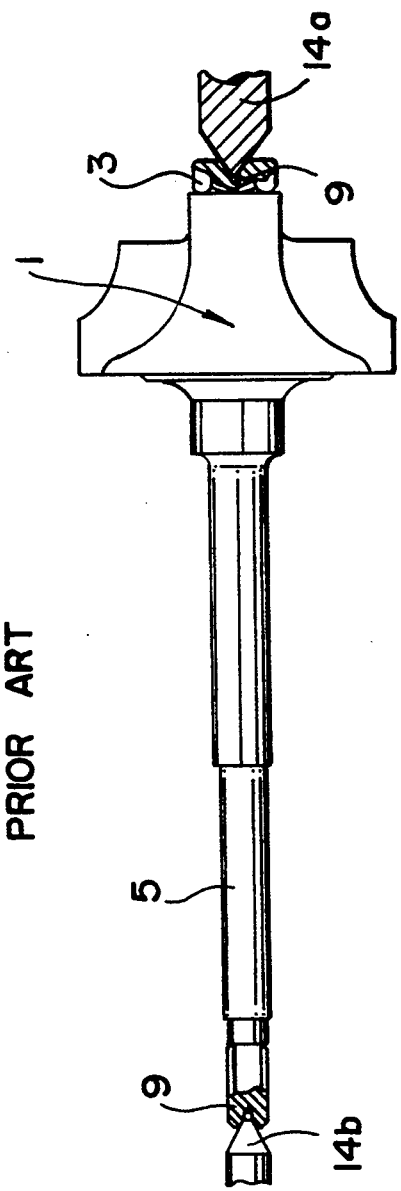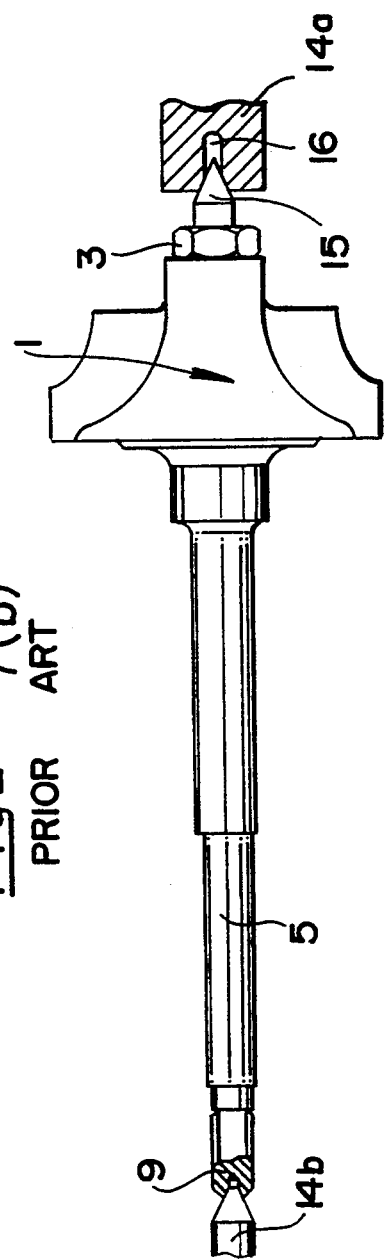

MACHINING METHOD OF CERAMIC TURBINE ROTOR

BACKGROUND OF THE INVENTION

1. Field of the Invention

The present invention relates to a ceramic turbine rotor adapted for use in a supercharger of an internal combustion engine, and more particularly to a machining method of the ceramic turbine rotor.

2. Discussion of the Prior Art

In recent years, various component parts of internal combustion engines for automotive vehicles tend to be made of ceramic materials for enhancing the performance of the engines. In a machining process of a ceramic turbine rotor adapted for use in a supercharger of the engine, it is required to bring precisely the turbine rotor on-center for finishing the turbine blades. For such requirement, as shown in FIG. 7(a), a conventional turbine rotor 1 is formed at its hub portion 3 with a center hole 9 for engagement with a spindle 14a of a headstock and connected to a metallic support shaft 5 which is formed at its one end with a center hole 9 for engagement with a spindle 14a of a tailstock. Alternatively, as shown in FIG. 7(b), the conventional turbine rotor 1 is formed at its hub portion 3 with a conical projection 15 for engagement with a tapered center hole 16 in the spindle 14a of the headstock. In the former case, the ceramic turbine rotor is apt to crack at its center hole 9. If the presence of crack is not detected, the ceramic turbine rotor will be damaged during the machining process or actual use thereof. In the latter case, the conical projection 15 of the ceramic turbine rotor is apt to break during the machining process. If the conical projection of the turbine rotor remains after the machining process and is broken during the following assembly process the rotational balance of the turbine rotor will deteriorate.

SUMMARY OF THE INVENTION

It is, therefore, a primary object of the present invention to provide a machining method of a ceramic turbine rotor without causing the problems discussed above.

According to the present invention, there is provided a machining method of a ceramic turbine rotor having a hub portion integrally formed with a plurality of radial blades, the hub portion having a front end to be centered during a finishing process of the radial blades and a rear end coaxially connected to a metallic support shaft, which machining method comprises the steps of grinding the front distal end of the hub portion to form a tapered surface thereon; engaging the tapered surface of the hub portion with a corresponding tapered surface of an attachment mounted on a spindle of a headstock or a tailstock; and finishing the radial blades of the rotor in a desired form.

BRIEF DESCRIPTION OF THE DRAWINGS

Other objects, features and advantages of the present invention will be more readily appreciated from the following detailed description of a preferred embodiment thereof when taken together with reference to the accompanying drawings, in which:

FIG. 1 depicts a machining method of a ceramic turbine rotor in accordance with the present invention;

FIG. 2 depicts a process of connecting the turbine rotor to a metallic support shaft;

FIG. 3 is an enlarged view illustrating an engaged condition of the turbine rotor with an attachment mounted on a spindle of a headstock;

FIG. 4 is a side view of a modification of the turbine rotor shown in FIG. 1;

FIG. 5 is a side view of another modification of the turbine rotor;

FIG. 6 is a side view of a further modification of the turbine rotor; and

FIGS. 7(a) and 7(b) each depict a conventional machining method of the turbine rotor.

DESCRIPTION OF THE PREFERRED EMBODIMENT

As illustrated in FIG. 2 of the drawings, a sintered ceramic turbine rotor 1 has a hub portion 3 integrally formed with a plurality of radial blades 2 and a boss portion 4 for connection to a metallic support shaft 5. The hub portion 3 of turbine rotor 1 is formed with a hexagonal portion 7 to be coupled with a corresponding hexagonal socket of a wrench. The support shaft 5 is in the form of a stepped shaft having one end formed with a cup-shaped portion 6 and another end formed with a center hole 9. In a grinding process of the turbine rotor 1, the hub portion 3 is carried by a support member of a grinding machine at its enlarged portion P1 while the radial blades 2 are carried by another support member of the grinding machine at their rear end faces P2 to position the turbine rotor in place. In a condition where the turbine rotor 1 has been positioned as described above, the front distal end of hub portion 3 is ground by a grinding wheel to form a tapered surface 8 for centering the turbine rotor 1 during a finishing process. Thereafter, the turbine rotor 1 is positioned at its enlarged portion P1 and tapered surface 8 to finish the boss portion 4.

The boss portion 4 of rotor 1 is coupled within an axial bore 6a of the cup-shaped portion 6 of support shaft 5 with a press fit to connect coaxially the turbine rotor 1 to the metallic support shaft 5. Subsequently, the turbine rotor 1 is positioned at its enlarged portion P1 and tapered surface 8 to form the center hole 9 in the other distal end of support shaft 5.

In the following machining process, the support shaft 5 is engaged at its center hole 9 with a spindle 14 of a tailstock while the hub portion 3 of turbine rotor 1 is engaged at its tapered surface 8 with a corresponding tapered surface 10 of an attachment 11 mounted on a spindle of a headstock to bring the turbine rotor 1 on-center. In a condition where the turbine rotor 1 has been centered as described above, the turbine blades 2 are finished by grinding at their outer peripheries, and the support shaft 5 is finished by grinding to form a journal portion 12. In addition, the cup-shaped portion 6 of support shaft 5 is ground to form annular grooves 13 thereon and threaded at its distal end portion 17.

During the machining process, the tapered surface 10 of attachment 11 is defaced by rotational friction with the tapered surface 8 of turbine rotor 1. If the tapered surface 10 of attachment 11 is partly engaged with the tapered surface 8 of turbine rotor 1, a stepped portion is formed on the tapered surface 10 of attachment 11, resulting in disorder of the machining datum or concentricity of the turbine rotor 1. For this reason, it is preferable that as shown in FIG. 3, the width $L_1$ of the tapered surface 10 is determined to be smaller than the width $L_2$ of the tapered surface 8 of turbine rotor 1 so that the tapered surface 10 of attachment 11 is engaged in its entirety with the tapered surface 8 of turbine rotor 1.

With the machining process described above, the tapered surface 8 of turbine rotor 1 can be precisely formed by grinding in a simple manner without causing any problem in the prior art discussed in the introductory portion of this specification. In a practical embodiment of the present invention, as shown in FIG. 4, the hub portion of turbine rotor 1 may be reduced in diameter only at its front end portion to facilitate coupling with a wrench. Alternatively, as shown in FIG. 5, the hub portion 3 of turbine rotor 1 may be formed with a pair of parallel flat faces 19 to be clamped by a spanner. Furthermore, as shown in FIG. 6, the front end of hub portion 3 of turbine rotor 1 may be formed as a hexagonal head 20 which is ground at its front distal end to form a tapered surface 8 for engagement with the tapered surface 10 of the attachment 11. In addition, it is desirable that the tapered surface 8 of the hub portion 3 is formed at an angle $\theta$ of from 20° to 50° with respect to the axis of the attachment.

What is claimed is:

1. A machining method of a ceramic turbine rotor having a hub portion integrally formed with a plurality of radial blades, the hub portion having a front end to be centered during a finishing process of the radial blades and a rear end coaxially connected to a metallic support shaft, comprising the steps of:

grinding the front distal end of said hub portion to form a tapered surface thereon;

engaging the tapered surface of said hub portion with a corresponding tapered surface of an attachment mounted on a spindle of a headstock or a tailstock; and finishing the radial blades of said rotor in a desired form.

2. A machining method of a ceramic turbine rotor as recited in claim 1, wherein the tapered surface of said attachment is formed smaller in width than the tapered surface of said hub portion.

* * * * *